(12) United States Patent  (10) Patent No.: US 8,552,374 B2
Hikmet et al.  (45) Date of Patent: Oct. 8, 2013

(54) SPECTRAL DETECTOR

(75) Inventors: Rifat A. M. Hikmet, Eindhoven (NL); Eduard J. Meijer, Eindhoven (NL); Ties Van Bommel, Horst (NL)

(73) Assignee: Koninklijke Philips N.V., Eindhoven (NL)

( * ) Notice: Subject to any disclaimer, the term of this patent is extended or adjusted under 35 U.S.C. 154(b) by 274 days.

(21) Appl. No.: 13/121,430

(22) PCT Filed: Sep. 24, 2009

(86) PCT No.: PCT/IB2009/054187
§ 371 (c)(1),
(2), (4) Date: Mar. 29, 2011

(87) PCT Pub. No.: WO2010/038175
PCT Pub. Date: Apr. 8, 2010

(65) Prior Publication Data
US 2011/0174977 A1    Jul. 21, 2011

(30) Foreign Application Priority Data
Oct. 2, 2008  (EP) ..................................... 08165742

(51) Int. Cl.
G02F 1/13   (2006.01)
(52) U.S. Cl.
USPC ........................................................ 250/331
(58) Field of Classification Search
USPC ................ 250/225, 226, 331, 332, 458.1
See application file for complete search history.

(56) References Cited

U.S. PATENT DOCUMENTS

| | | | |
|---|---|---|---|
| 3,726,584 | A | 4/1973 | Adams et al. |
| 4,726,663 | A | 2/1988 | Buzak |
| 5,762,823 | A | 6/1998 | Hikmet |
| 5,798,057 | A | 8/1998 | Hikmet |
| 5,877,826 | A | 3/1999 | Yang et al. |
| 6,359,673 | B1 | 3/2002 | Stephenson |
| 6,674,504 | B1 | 1/2004 | Li et al. |
| 2003/0020855 | A1 | 1/2003 | Lee |
| 2006/0077325 | A1 | 4/2006 | Li et al. |
| 2007/0076295 | A1 | 4/2007 | Wen et al. |
| 2007/0123762 | A1* | 5/2007 | Crawford et al. ............. 600/328 |
| 2007/0273265 | A1 | 11/2007 | Hikmet |

FOREIGN PATENT DOCUMENTS

| | | |
|---|---|---|
| GB | 1372921 | 11/1974 |
| GB | 2321717 A | 8/1998 |
| JP | 2002250932 | 9/2002 |
| WO | 9723580 A1 | 7/1997 |
| WO | 9963400 A1 | 12/1999 |
| WO | 2005074792 A1 | 8/2005 |

* cited by examiner

Primary Examiner — Mark R Gaworecki
(74) Attorney, Agent, or Firm — Mark L. Beloborodov (57) ABSTRACT

The invention relates to a spectral detector for measuring properties of light over portions of the electromagnetic spectrum including cholesteric liquid crystal material and switching means capable of varying the pitch of the helix of the cholesteric liquid crystal material, so that the position of the transmission wavelength band is adjusted in response to the switching means. The spectral detector may further include at least one light direction selecting structure for selecting light incident on the spectral detector having a certain angle of incidence. This invention also relates to a lighting system including the spectral detector of the invention.

19 Claims, 7 Drawing Sheets

SPECTRAL DETECTOR

FIELD OF THE INVENTION

The present invention relates to a spectral detector for measuring properties of light over portions of the electromagnetic spectrum. In particular, the present invention relates to a spectral detector including cholesteric liquid crystal.

BACKGROUND OF THE INVENTION

In environments illuminated by artificial light sources, lighting management becomes increasingly important. In general, the use of solid state light sources, such as light emitting diodes, allows tuning the colour of the emitted light. It is generally desirable to be able to detect, e.g., the colour point and the colour rendering index of the light in the light source environment, as well as other properties of the light emitted from the light sources over a portion of the electromagnetic spectrum in order to control and adjust preferred light settings or to create dynamic lighting atmospheres. Moreover, it is preferable that such detection can be performed in an unobtrusive manner. In addition, it is desirable to be able to determine properties, such as those above, of light incident on certain positions in the lighting environment, such as an artificially lighted room. Thus, not only the flux, but also spectral information of the light sources is of interest. It would therefore be desirable to have an inexpensive, unobtrusive, and easily manufactured device capable of such detection.

A drawback with known spectral detectors is that they generally require auxiliary optical components which require alignment and space, and thus, are expensive and bulky, and can generally not be arranged unobtrusively at the desired location to perform spectral detection. A further drawback with known spectral detectors is that they are not capable of measuring characteristics of light, such as spectral information, as a function of the angle of incidence of the incident light without actually moving the spectral detector and/or a fiber coupled to the spectral detector.

Documents U.S. Pat. No. 5,762,823A and U.S. Pat. No. 5,798,057A disclose a method for manufacturing a switchable cholesteric filter comprising a mixture of polymerizable liquid-crystalline molecules provided between two substantially parallel substrates which are each provided with an electrode.

SUMMARY OF THE INVENTION

Thus, it is an object of the present invention to provide a spectral detector capable of measuring properties of light over portions of the electromagnetic spectrum that is an improvement over known devices.

Liquid crystals are substances that exhibit a phase between the conventional liquid and solid phases. For instance, a liquid crystal may be flowing like a liquid, but the molecules in the liquid crystal may still be arranged and/or oriented as in a crystal. Liquid crystals may be in various phases, which are characterized by the type of molecular ordering that is present in the liquid crystal. In particular, liquid crystals in the cholesteric, or chiral nematic, phase exhibits chirality, or handedness.

The molecules in cholesteric liquid crystals are chiral, that is, they lack inversion symmetry. Cholesteric liquid crystals naturally adopt (without external influences, such as an electric field) an arrangement of long successions of molecules, wherein the general direction of such successions of molecules, the director, varies helically in a direction about a helical axis. Thus, the molecules exhibit a helical structure in the cholesteric phase. The distance over which the helix has rotated 360°, the helical, or chiral, pitch p (in the following referred to as simply the pitch), along with the refractive index, the wavelength and angle of incidence of incident light, etc., determine the optical properties of the cholesteric liquid crystal.

In general, a cholesteric liquid crystal mixture comprises nematic liquid crystals and a chiral component that may be liquid crystalline itself If the pitch is of the order of a wavelength corresponding to visible light (i.e., comprised within the range of wavelengths corresponding to visible light), reflection of light will occur, with the wavelength of reflection $\lambda$ being $$\lambda = n/(HTP \cdot x) = n \cdot p,$$

where n is the mean refractive index of the cholesteric liquid crystal, x is the fraction of the chiral dopant present in the cholesteric liquid crystal mixture, and HTP is the so called helical twisting power of the chiral component in a host material. In the equation above, (HTP·x) is equal to the reciprocal of the pitch (1/p). Only light having one (circular) polarization direction is reflected. In order to obtain a material with a reflection band position at the desired wavelength, the fraction x of the chiral component in the host material can be adjusted. It is also possible to use another chiral dopant having another HTP for obtaining a reflection band at a desired wavelength. For special cholesteric mixtures, the HTP is temperature dependent, and thus, such cholesteric mixtures are thermochromic. In other cholesteric mixtures, the chiral component in the cholesteric liquid crystal is photoisomerizable, or photochromic. This means that on irradiation of such a mixture, parts of the chiral material change their twisting power (HTP), and as a result, the reflection band shifts its position.

Cholesteric liquid crystals are normally not macroscopically oriented, and the cholesteric liquid crystals are randomly oriented. Therefore, it is necessary to induce macroscopic orientation into the molecules so that the molecules become macroscopically oriented. In order to induce macroscopic orientation, the cholesteric liquid crystal can, for example, be positioned between two substrates including a uniaxially buffed polymer, such as polyimide. In this way, a so called Grandjean texture having planar orientation of cholesteric molecules is induced, where the cholesteric molecular helix is oriented perpendicular to the substrates.

The present invention is based on that the reflection wavelength of light incident on cholesteric liquid crystal material depends on the pitch of the helix of chiral molecules, which can be controlled in different ways, such as indicated above. By placing such cholesteric liquid crystal material between two polarizers, a bandpass filter is obtained that converts incident light having a first wavelength band to polarized light having a second wavelength band. Thereby, a switchable optical filter can be achieved, by using a switching means capable of varying the pitch of the helix of chiral molecules, such that the position of the transmission wavelength band is adjusted in response to the switching means.

Another way of obtaining a bandpass filter is by using two broadband cholesteric reflectors stacked on top of each other, wherein in the visible region there is no (or very little) overlap, so that light is transmitted in this region. Considering that cholesteric liquid crystals reflect only one polarization direction, a broadband circular polarizer needs to be placed at the bottom or at the top of the stack in order for the bandpass filter to be independent of the polarization of incident light.

Another possibility is to use a stack of cholesteric materials working for both left and right polarization directions.

These filters can also be used in the reflection mode, so that only light reflected by the cholesteric layer reaches a photo detector.

According to a first aspect of the invention, there is provided a spectral detector including a photo detector array and a switchable cholesteric liquid crystal optical filter, as defined in the independent claim 1, which spectral detector presents several advantages over known devices. The device according to the invention can in a simple way directly be used to measure properties of light over different portions of the electromagnetic spectrum, wherein spectral properties of the light passing through the optical filter, or light reflected by the optical filter, can be controlled or switched in a simple and reliable manner. Moreover, by using the spectral detector according to the invention, such measurements can be performed in an unobtrusive way in a variety of desired lighting environments due to the small form factor, that is the physical shape and size, of the spectral detector of the invention. Because of the small form factor, the spectral detector can readily be integrated in a number of applications, such as lamps, optical devices, and luminaires. Furthermore, such a spectral detector can be manufactured in a simple and inexpensive manner.

According to a second aspect of the invention, there is provided a lighting system as defined in claim 12 including a spectral detector according to the first aspect of the invention or embodiments thereof The lighting system of the invention allows for controlling the parameters that govern the operation or illumination properties of the lighting system in a simple and reliable way, by employing measurements performed by the spectral detector. The spectral detector can be arranged inside the lighting system or as an external device coupled to the lighting system.

According to an embodiment of the present invention, the switching means is capable of one or more of heating at least one liquid crystal layer and applying an electrical field across at least one liquid crystal layer, in order to adjust the reflection wavelength band of the cholesteric material in a reversible manner. Depending on the type of cholesteric mixture that is used, such means allow for gradually adjusting the position of the reflection band for the cholesteric material as a function of temperature induced in the cholesteric material and/or voltage applied to the cholesteric material, or switching between different optical states, for instance, between substantially fully transmissive and substantially fully reflective for a portion of the electromagnetic spectrum, e.g., substantially the whole wavelength band of visible light.

According to another embodiment of the present invention, the spectral detector includes at least two polarizers, preferably linear polarizers, wherein the at least two polarizers are arranged such that at least one layer including a cholesteric liquid crystal mixture is arranged between at least two of the polarizers, and such that at least one of said polarizers has a crossed orientation with respect to at least one of the other polarizers. By such a configuration, a bandpass filter is produced, which converts light incident on the optical filter having a certain wavelength band to linearly polarized light having a narrow wavelength band at around a wavelength defined by the pitch of the helix of the chiral molecules included in the cholesteric material and the mean refractive index of the cholesteric material. Thus, only linearly polarized light within a well-defined wavelength range is transmitted through the polarizers and the cholesteric liquid crystal material.

According to yet another embodiment of the present invention, the spectral detector further includes at least one circular polarizer, capable of filtering circularly polarized light, thus providing further advantages. For example, if two broadband cholesteric liquid crystal layers are arranged next to each other, a small wavelength band of light is transmitted. By employing a circular polarizer, preferably configured such that it has a polarization having opposite sense to that of the polarization of the cholesteric liquid crystal layers, transmission of the other circular polarization component of the light can be eliminated.

Alternatively, according to another embodiment of the present invention, a plurality of cholesteric liquid crystal layers arranged proximate to each other, for instance in a stack, can be employed to achieve a device whose operation is independent of the polarization of the incident light.

According to yet another embodiment of the present invention, the spectral detector further includes at least one absorber or absorbing layer. In this way, the spectral detector can be arranged such that only light reflected from the cholesteric liquid crystal layer reaches the photo detector array. In other words, only light within the reflection wavelength band is directed to the photo detector array.

According to yet another embodiment of the present invention, the spectral detector further includes at least one anti-reflecting layer or anti-reflecting coating. Preferably, in addition to the at least one anti-reflecting layer, the spectral detector also includes at least one absorbing layer, as mentioned above. By these configurations, there is provided increased versatility in the procedure of filtering light using the cholesteric optical filter, and subsequently detecting the filtered or reflected light using the photo detector array.

According to yet another embodiment of the present invention, the spectral detector further includes a retardation layer for bringing a phase difference to light passing through the retardation layer. The retardation layer may for example be a half-wavelength retardation layer for bringing a phase difference corresponding to half of the wavelength of the light to the light passing through the retardation layer. This provides increased versatility in the procedure of filtering light using the cholesteric optical filter, and subsequently detecting the filtered or reflected light using the photo detector array.

According to yet another embodiment of the present invention, the spectral detector includes a plurality of layers, wherein each layer includes a cholesteric liquid crystal mixture, the layers being arranged proximate to each other so as to form a composite layer. Furthermore, each of the layers is associated with a reflection wavelength characteristics and a polarization characteristics, wherein the composite layer is arranged such that light transmitted through the composite layer is independent of the polarization of light incident on the composite layer.

According to yet another embodiment of the present invention, the at least one cholesteric liquid crystal layer coupled to the at least one switching means is arranged such that the cholesteric liquid crystal mixture in at least one portion of said cholesteric liquid crystal layer has a different pitch than the cholesteric liquid crystal mixture in other portions of the cholesteric liquid crystal layer. By this configuration, a ray of light incident on the at least one cholesteric liquid crystal layer is generally allowed to pass through a portion of the cholesteric liquid crystal layer having an optical transmissivity that differs from other portions of the cholesteric liquid crystal layer. This allows for greater versatility in the procedure of filtering light using the cholesteric optical filter, and subsequently detecting the filtered light using the photo detector array. Preferably, the pixels of the photo detector array are aligned with the portions of the cholesteric liquid crystal layer having, in general, different optical transmission characteristics. Thereby, pixels of the photo detector array can be associated with different transmission wavelengths.

According to yet another embodiment of the present invention, the cholesteric liquid crystal mixture in the at least one cholesteric liquid crystal layer, coupled to the at least one switching means, is configured in accordance with one or more of that the position of the reflection band of said layer can be changed, and that the magnitude of the reflection band of said layer can be changed. This could be achieved by the cholesteric liquid crystal mixture in the cholesteric liquid crystal layer being thermochromic or photochromic, that is to say, on changing the temperature or irradiation of such a mixture, respectively, parts of the chiral material change their twisting power. Thereby, a switchable cholesteric optical filter is provided.

According to yet another embodiment of the present invention, the cholesteric liquid crystal mixture in the at least one cholesteric liquid crystal layer coupled to the at least one switching means is one or more of thermochromic, photochromic, or photoisomerizable, and substantially transparent (i.e. with a light absorbtion of a few procents, preferably in the range of 1-10%) to at least a portion of the spectrum of visible light when an electric field is applied across said layer, or when the intensity of such an electric field is changed. Thus, the pitch of the helix of the chiral component in the cholesteric liquid crystal mixture in the at least one cholesteric liquid crystal layer is adjustable by a change in temperature, photoexcitation, and/or an applied electric field. Thereby, the reflection wavelength band of one or more cholesteric liquid crystal layers can be adjusted in response to changes in temperature, irradiation by, inter alia, light, and/or an applied electric field.

According to yet another embodiment of the present invention, the spectral detector further includes a light direction selection layer comprising a plurality of portions. These portions are configured such that at least one portion is arranged such that it is capable of selecting light incident on the spectral detector having a different direction compared to other portions of the light direction selection layer. In other words, there is provided a segmented layer, wherein each portion or segment in general is capable of selecting light having different angles of incidence. Preferably, the pixels of the photo detector array are aligned with the segments of the light direction selection layer, so that pixels of the photo detector array can be associated with different angles of incidence. In this way, the spectral detector allows spectral information as a function of angle of incidence to be obtained.

According to yet another embodiment of the present invention, the spectral detector further includes a light direction selection layer comprising a plurality of portions. These portions are configured such that at least one portion is arranged such that it is capable of selecting light incident on the spectral detector having a different direction compared to other portions of the light direction selection layer. Also, the spectral detector further comprises one or more of the following: at least one absorber or absorbing layer, at least one circular polarizer, at least one anti-reflection layer or anti-reflection coating, and at least one retardation layer, such as have been described above.

According to yet another embodiment of the present invention, the at least one switching means, operatively coupled to at least one of the cholesteric liquid crystal layers, is capable of varying one or more of the magnitude and the direction of the helical pitch of the chiral component in the cholesteric liquid crystal mixture included in said at least one cholesteric liquid crystal layer. By the direction of the helical pitch, it is meant the general direction of the helical axis of the cholesteric liquid crystal material. By this configuration, there is provided increased versatility in the procedure of switching the cholesteric liquid crystal material.

As realized by a person skilled in the art, it is within the scope of the invention that the features described above with reference to the different aspects and embodiments of the present invention, as well as the features disclosed in the appended claims, can be combined in an arbitrary manner.

It should be understood that the exemplary embodiments of the present invention as shown in the figures are for purpose of exemplification only. Further embodiments of the present invention will be made apparent when the figures are considered in conjunction with the following detailed description and the appended claims.

Furthermore, it is to be understood that the reference signs provided in the drawings are for the purpose of facilitating quicker understanding of the claims, and thus, they should not be construed as limiting the scope of the invention in any way.

BRIEF DESCRIPTION OF THE DRAWINGS

FIGS. 2a-2e are schematic drawings illustrating the working principle of the present invention in accordance with exemplary embodiments of the invention, in which:

DETAILED DESCRIPTION OF THE EMBODIMENTS

Preferred embodiments of the present invention will now be described for the purpose of exemplification with reference to the accompanying drawings, wherein like numerals indicate the same or similar elements throughout the views. The present invention encompasses also other exemplary embodiments that comprise combinations of features described in the following. Additionally, other exemplary embodiments of the present invention are defined in the appended claims.

In the following, especially with reference to the figures, the cholesteric liquid crystals that are referred to are preferably in a macroscopically oriented state.

Figure 1:
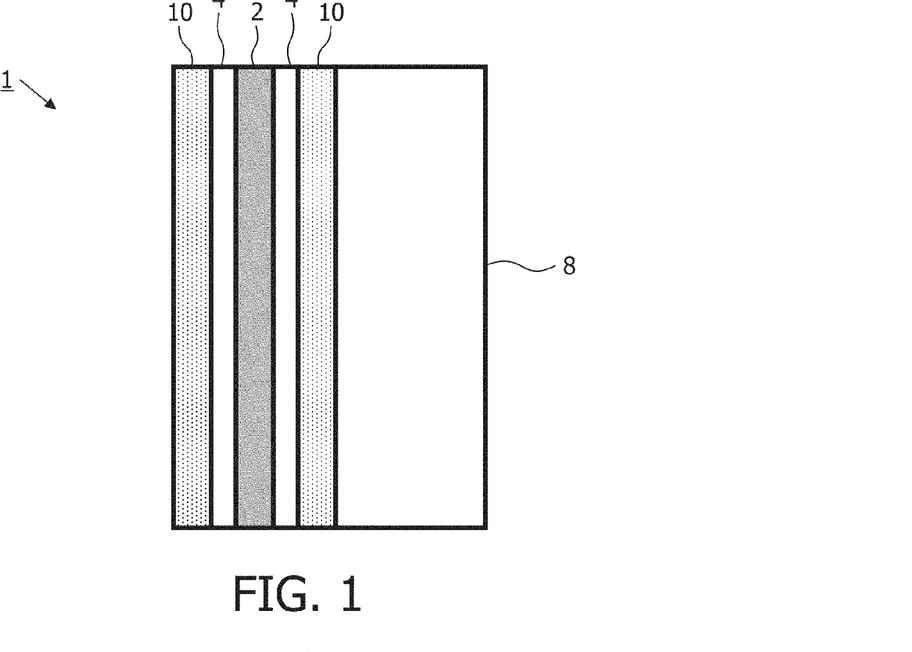
FIG. 1 is a schematic side view of an exemplary embodiment of the present invention.

FIG. 1 is a schematic side view of an exemplary embodiment of the present invention, wherein a spectral detector 1 according to the exemplary embodiment of the invention comprises a layer 2 including a cholesteric liquid crystal mixture. Although the exemplary embodiment illustrated in FIG. 1 includes one layer that contains a cholesteric liquid crystal mixture, it is to be understood that the present invention encompasses other exemplary embodiments comprising any number of such layers. The liquid crystal material 2 may further contain a polymer or a polymeric network. However, this would not hamper switching of the layer 2, as described in the following. Preferably, the cholesteric liquid crystal mixture is thermochromic, photoisomerizable, and/or is such that when a sufficiently high electric field is applied, the material becomes transparent for, inter alia, visible light. As known in the art, by photoisomerizable it is meant that structural changes can be induced by photoexcitation. Both reversible and irreversible photoisomerization reactions exist. However, in the context of the present invention, the photoisomerization preferably is reversible.

According to the exemplary embodiment of the invention shown in FIG. 1, the spectral detector 1 optionally further includes two substrates 10. Such substrates 10, which preferably are transparent for, among other things, visible light, provides, e.g., enhanced mechanical robustness of the device 1. According to this particular embodiment, the spectral detector filter 1 also includes two transparent electrodes 4, transparent for, inter alia, visible light, wherein the cholesteric liquid crystal 2 is sandwiched between the electrodes 4. Optionally, according to a preferred embodiment, the cholesteric liquid crystal 2 is arranged between orientation layers (not shown), which induce a Grandjean texture state in the liquid crystal. Furthermore, a photo detector array 8 is included in the spectral detector 1, capable of sensing electromagnetic radiation, preferably including visible light. Preferably, the photo detector array 8 consists of one or more of a photodiode array, a charge-coupled device (CCD), and a phototransistor array. However, the photo detector array is not limited to these choices, but rather, any photo detector array that can be used to achieve the function of the first aspect of the invention or embodiments thereof is considered to be within the scope of the invention. Furthermore, wiring, circuits, etc., for coupling the photo detector array to a processing unit, a control unit, analysis equipment, etc. (not shown), have been omitted from FIG. 1 for the purpose of facilitating the explanation of the invention.

Figure 2A:
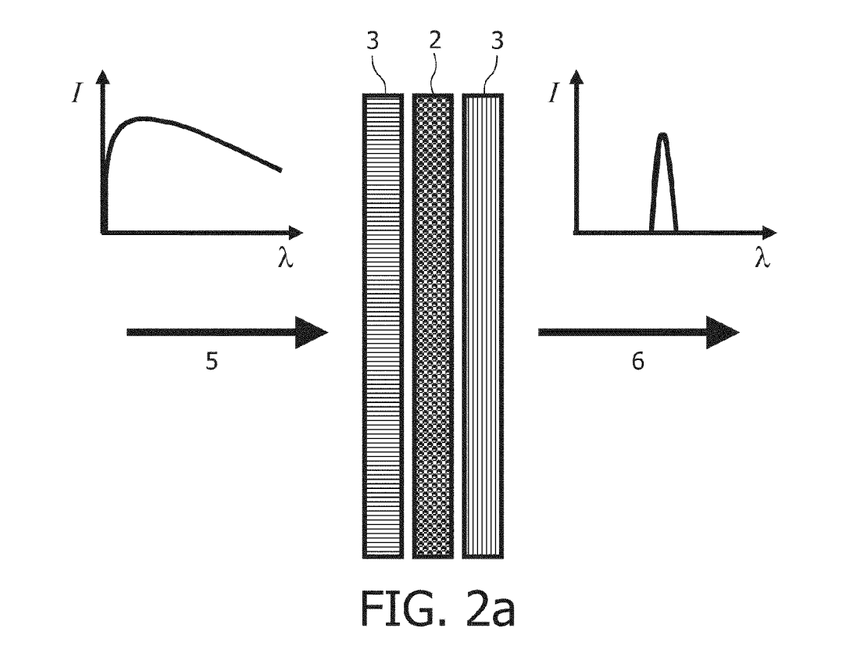
FIG. 2a is a schematic side view that illustrates the working principle of the present invention in accordance with an exemplary embodiment, wherein a cholesteric liquid crystal layer is arranged between two linear polarizers.

FIG. 2a is a schematic side view that illustrates the working principle of the present invention in accordance with an exemplary embodiment, wherein a cholesteric liquid crystal layer 2 is arranged between two linear polarizers 3. Each polarizer may consist of a coatable polarizing material, or even be a polarizer that is commercially available. In this exemplary embodiment, the polarizers 3 are arranged such that one polarizer has a crossed orientation with respect to the other polarizer. Such a configuration results effectively in a bandpass filter that is capable of converting light incident on it to linearly polarized light having a narrow wavelength band around a wavelength $\lambda = np$, where p is the pitch of the helix of the chiral liquid crystal molecules and n is the mean refractive index of the cholesteric liquid crystal material.

FIG. 2a schematically shows incoming light 5 having an exemplary wavelength spectrum, that is the intensity of light I as a function of the wavelength $\lambda$ of the light, as shown to the left in FIG. 2a, and outgoing light 6, having passed through the bandpass filter comprising two polarizers 3, arranged in a crossed orientation relative each other, and the layer of cholesteric liquid crystal material 2, having a wavelength spectrum as shown to the right in FIG. 2a, consisting of a narrow wavelength band.

Figure 2B:
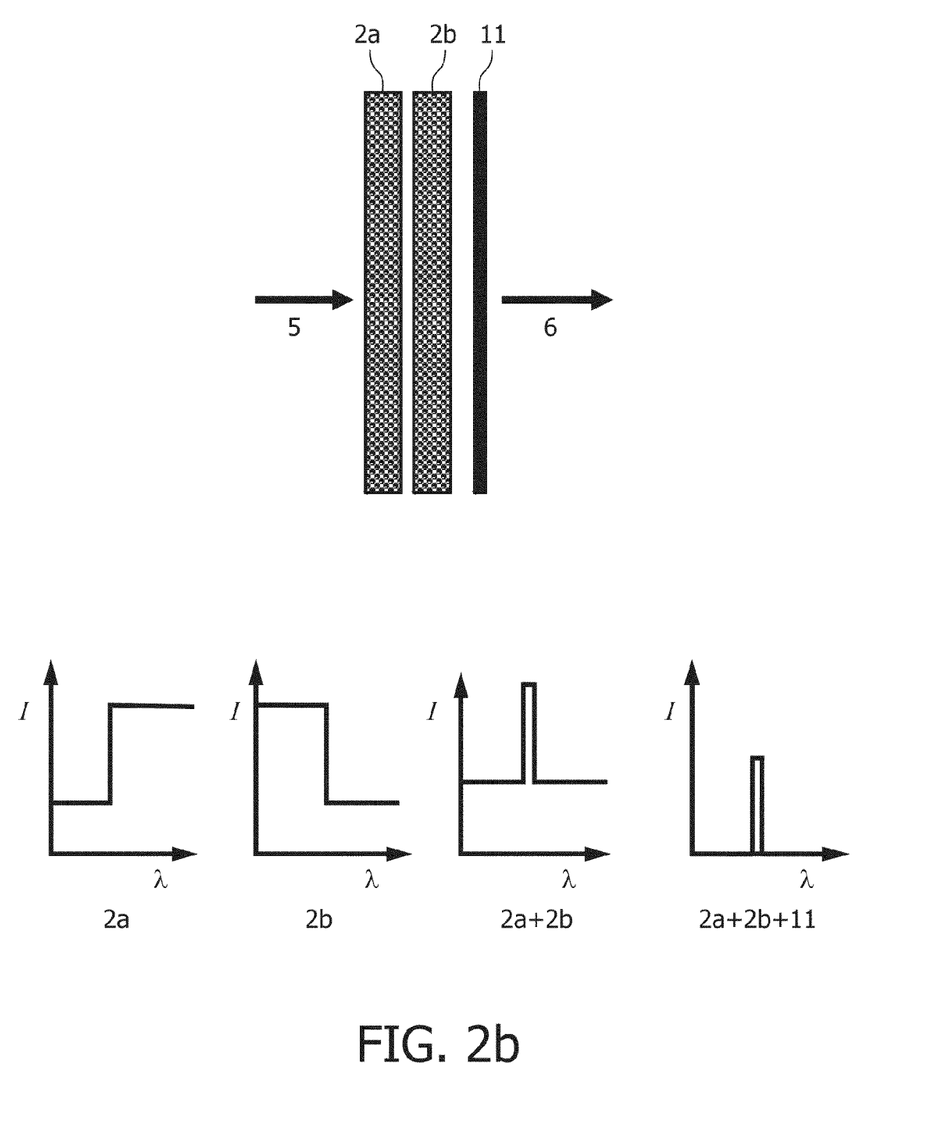
FIG. 2b is a schematic side view that illustrates the working principle of the present invention in accordance with an exemplary embodiment, wherein two cholesteric liquid crystal layers are arranged on a circular polarizer.

FIG. 2b is schematic side view that illustrates the working principle of the present invention in accordance with another exemplary embodiment, wherein two cholesteric liquid crystal layers 2a and 2b are arranged on top of a circular polarizer 11. In FIG. 2b two different layers 2a and 2b, having broadband reflection characteristics and the same circular polarization direction, are arranged on top of each other together with a broadband circular polarizer 11. The exemplary graphs in FIG. 2b, indicated by "2a", "2b", "2a+2b", and "2a+2b+11", schematically show the transmission characteristics (wavelength spectrum) of the cholesteric filters seperately and when they are combined without and with the circular polarizer 11.

Figure 2C:
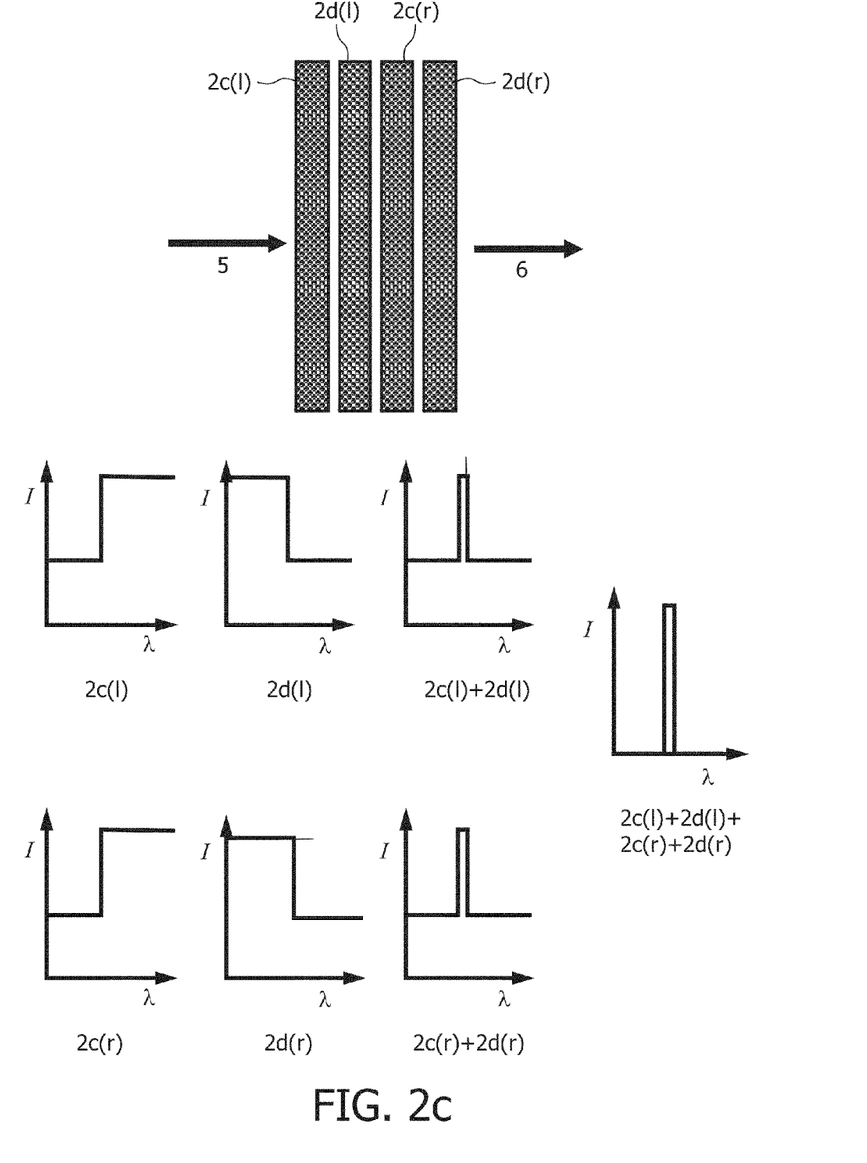
FIG. 2c is a schematic side view that illustrates the working principle of the present invention in accordance with an exemplary embodiment, wherein four cholesteric liquid crystal layers are arranged on each other.

FIG. 2c is a schematic side view that illustrates the working principle of the present invention in accordance with yet another exemplary embodiment, wherein four cholesteric liquid crystal layers 2c(l), 2d(l), 2c(r), and 2d(r) are arranged on top of each other. The layers indicated by 2c(l) and 2d(l), having broadband reflection characteristics and left-hand circular polarization direction, are arranged on the layers 2c(r) and 2d(r), having broadband reflection characteristics and right-hand circular polarization direction. Similarly to FIG. 2b, the exemplary graphs in FIG. 2c, indicated by "2c(l)", "2d(l)", "2c(r)", "2d(r)", "2c(l)+2d(l)", "2c(r)+2d(r)", and "2c(l)+2d(l)+2c(r)+2d(r)", schematically show the transmission characteristics of the cholesteric filters seperately and when some of them and all of them are combined.

The embodiments illustrated in FIGS. 2b and 2c are exemplary, for example in that the number of cholesteric liquid crystal layers is not limited to strictly two and four, respectively. Rather, any number of cholesteric liquid crystal layers could be employed, in conjunction with suitable choices of reflection/transmission and/or polarization characteristics for each of the cholesteric liquid crystal layers.

Figure 2D:
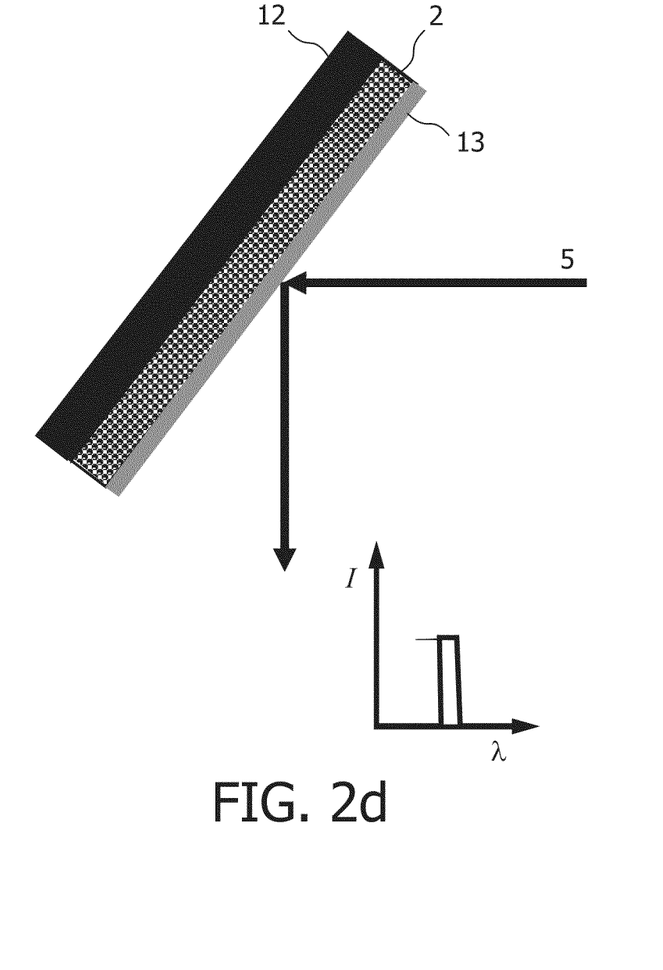
FIG. 2d is a schematic side view that illustrates the working principle of the present invention in accordance with an exemplary embodiment, wherein a cholesteric liquid crystal layer is used in the reflection mode.

FIG. 2d is a schematic side view that illustrates the working principle of the present invention in accordance with yet another exemplary embodiment, wherein a cholesteric liquid crystal layer 2 is used in the reflection mode. In this case, an absorbing layer, or absorber, 12 may be arranged on one side of the cholesteric liquid crystal layer 2 and, optionally or alternatively, an anti-reflection layer or coating 13 may be arranged on the opposite side of the cholesteric liquid crystal layer 2. By such a configuration, only one polarization direction will be reflected.

Figure 2E:
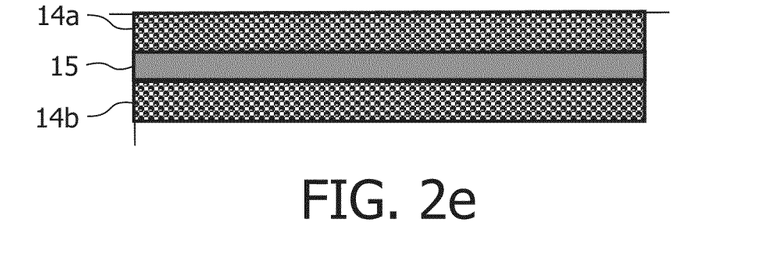
FIG. 2e is a schematic side view that illustrates the working principle of the present invention in accordance with an exemplary embodiment, wherein a half-wavelength retardation layer is placed between two cholesteric liquid crystal layers, which reflect polarized light.

In order to obtain an increased reflection, two cholesteric liquid crystal layers, one reflecting left-handed and the other reflecting right-handed polarization directions, can be used. Alternatively, as illustrated in FIG. 2e, two cholesteric liquid crystal layers 14a, 14b reflecting the same circular polarization direction, in conjunction with a half-wavelength retardation layer 15, arranged in between the two cholesteric liquid crystal layers 14a, 14b, can be used.

According to the first aspect of the present invention, the spectral detector 1 includes at least one switching means operatively coupled to at least one cholesteric liquid crystal layer, which switching means is capable of changing the position of the reflection band and/or the magnitude of the reflection band of the cholesteric liquid crystal. In the exemplary embodiment of the present invention illustrated in FIG. 1, this switching means comprises two transparent electrodes 4, with the cholesteric liquid crystal layer 2 sandwiched between the electrodes 4, the electrodes 4 being transparent for, inter alia, visible light. A preferred example of such electrodes is thin layers of indium tin oxide. Such indium tin oxide electrodes are, as known in the art, optically transparent and electrically conductive. By means of the electrodes 4, an electrical field can be applied across the cholesteric liquid crystal 2, thereby either inducing a reversible change in the position of the reflection band and/or inducing a change in the magnitude of the reflection band of the cholesteric liquid crystal. Yet another possibility is to switch between different optical states, for instance, between totally transmissive and totally reflective for a portion of the electromagnetic spectrum, e.g., substantially the whole wavelength band of visible light, by applying substantially different voltages to the cholesteric liquid crystal layer 2, preferably using electrodes such as shown in FIG. 1.

An alternative approach would be to employ dielectric heating or resistive heating of the cholesteric liquid crystal material. For example, by applying a high frequency electrical field across the cholesteric liquid crystal material, the material can be heated as a result of dielectric loss. In the same way, by applying a voltage through an electrode, resistive heating of the electrode can be induced. Thus, by using resistive heating and/or dielectric heating, a gradual change of the pitch of the helix of chiral molecules in the cholesteric liquid crystal material 2 can be induced. In other words, it is possible to control the position of the reflection wavelength band of the cholesteric liquid crystal and/or its magnitude of reflection/transmission in a gradual and reliable manner, continually sweeping the electromagnetic spectrum. Such a control could also be achieved by controllably applying a voltage to the cholesteric liquid crystal 2 using electrodes such as shown in FIG. 1.

Wiring, circuits, etc., for coupling the electrodes 4 to an electrical power source or the like (not shown), have been omitted from FIG. 1 for the purpose of facilitating the explanation of the invention.

According to further exemplary embodiments of the present invention, the switching means is such that a shear force, a magnetic field, and/or pressure can be applied to cholesteric liquid crystal material for inducing a change in the magnitude and/or direction of the pitch of the helix of chiral molecules in the cholesteric liquid crystal material, in order to vary the position of the wavelength reflection band of the cholesteric liquid crystal material. By the direction of the helical pitch, it is meant the general direction of the helical axis of the cholesteric liquid crystal material.

Figure 3:
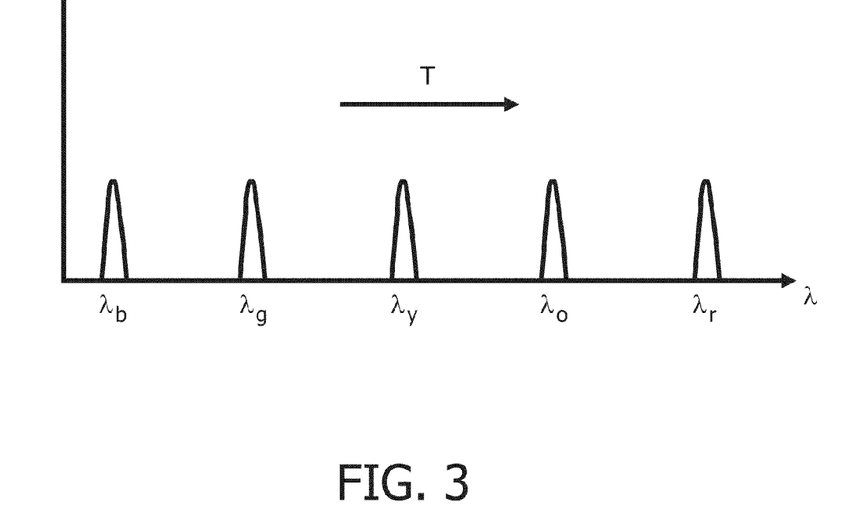
FIG. 3 is a schematic graph that illustrates the working principle of an exemplary embodiment of the present invention.
Figure 4A:
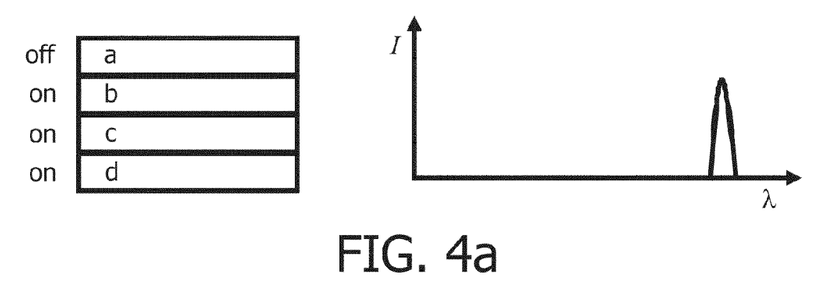
FIGS. 4a-4d are schematic views illustrating exemplary embodiments of the present invention.
Figure 4B:
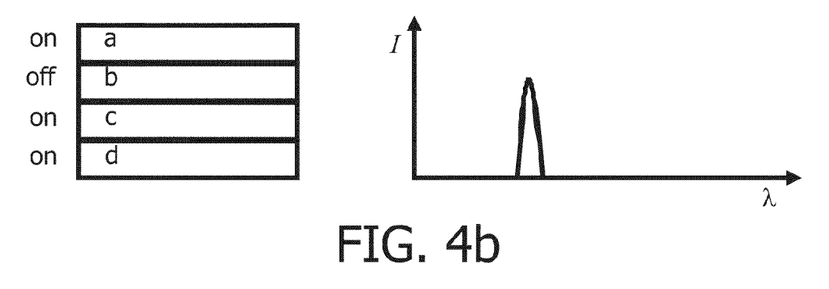
Figure 4C:
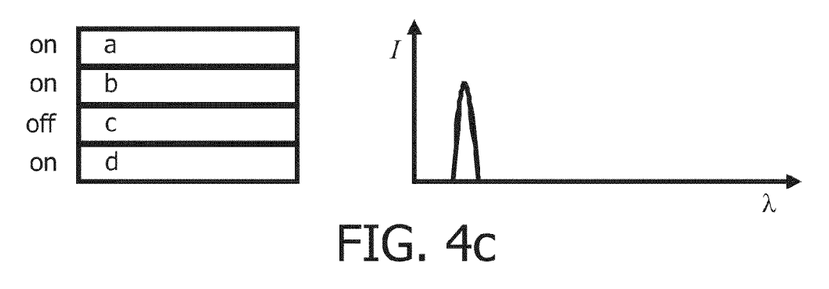
Figure 4D:
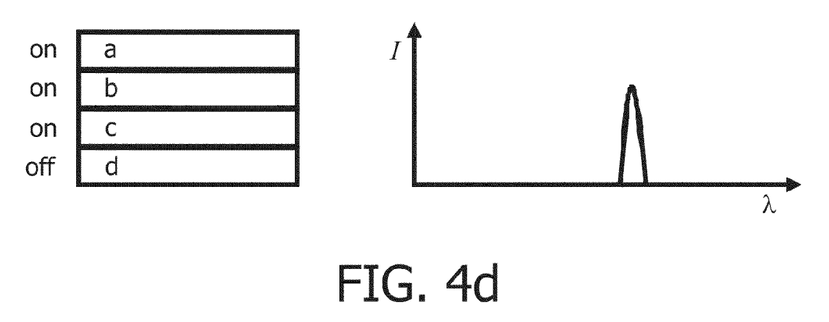

FIG. 3 is a schematic graph illustrating the working principle of an exemplary embodiment of the invention. In the graph, the transmission/reflection characteristics of a cholesteric liquid crystal filter, for example, such as illustrated in FIGS. 2a-2e, is shown for a number of temperatures T. Furthermore, in the graph it is schematically shown how the transmission wavelength band is shifted towards higher wavelengths λ as the temperature increases. The curves in the graph are shown in order of increasing temperature from left to right. Thus, at the lowest temperature indicated in FIG. 3, the transmission/reflection wavelength band is centered around $\lambda_b$, that is the wavelength of blue visible light (~0.47 μm), followed by the transmission wavelength band being centered around $\lambda_g$ (green visible light, ~0.50 μm), $\lambda_y$ (yellow visible light, ~0.58 μm), $\lambda_o$ (orange visible light, ~0.60 μm), and $\lambda_r$ (red visible light, ~0.70 μm), as the temperature increases.

In the following, different exemplary arrangements of the cholesteric liquid crystal layers included in the spectral detector according to the first aspect of the invention, or embodiments thereof, are described. As already mentioned above, according to an embodiment of the invention, it is possible to switch the cholesteric optical filter between different optical states, for instance between substantially fully transmissive and substantially fully reflective for a portion of the electromagnetic spectrum, e.g., substantially the whole wavelength band of visible light.

According to an exemplary embodiment of the invention, a plurality of cholesteric liquid crystal layers are arranged in, e.g., a stack, one layer on top of another, wherein each layer may be switched between optical states according to the above, preferably by applying an electrical field across each layer, preferably independently of the other layers. Furthermore, each cholesteric liquid crystal layer in general has a transmission characteristic, e.g., the position of the transmission wavelength band, that differs from the other layers. By using such a combination of cholesteric liquid crystal layers, each being individually switchable between different optical states and having a certain transmission characteristic, the reflection wavelength band of light for the overall device, including the plurality of cholesteric liquid crystal layers, can be controlled by switching one or more of the cholesteric liquid crystal layers on or off, as schematically illustrated in FIGS. 4a-4d.

In FIGS. 4a-4d, stacks of cholesteric liquid crystal layers are shown to the left, in this particular exemplary embodiment consisting of four cholesteric liquid crystal layers denoted by the letters a, b, c, and d, wherein the layers are in varying states of being switched on or off, indicated by the wordings "on" and "off" in FIGS. 4a-4d. Exemplary wavelength spectra of light transmitted through the stacks, for the four exemplary cases in FIGS. 4a-4d, are shown to the right in the respective figures. In the context of the illustrated embodiment in FIGS. 4a-4d, light is contemplated to be incident upon the stacks from the side of the stacks shown in FIGS. 4a-4d that is the longest, that is, from top to bottom of the stack of layers.

According to another exemplary embodiment of the present invention, the cholesteric liquid crystal layers are arranged proximate to each other, preferably in such a way so as to form a layer, wherein each individual layer in the thus formed layer has a different spectral response relative to at least one of the other layers. In this way, the transmission wavelength band of the cholesteric optical filter can be made to vary with the position on the cholesteric optical filter. Either the whole thus formed layer or each individual layer can be configured to be switchable between different optical states.

Figure 5:
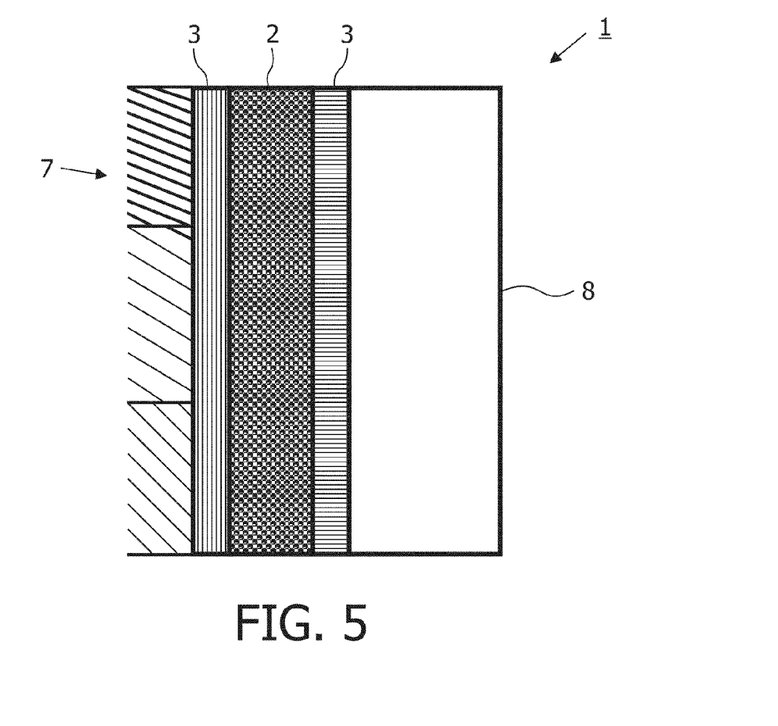
FIG. 5 is a schematic side view of another exemplary embodiment of the present invention.

FIG. 5 is a schematic side view of an exemplary embodiment of the present invention, wherein a spectral detector 1 according to the illustrated exemplary embodiment of the invention includes a photo detector array, or photo sensor array, referenced by the numeral 8, which photo detector array 8 is capable of sensing electromagnetic radiation, preferably including visible light. The spectral detector 1 in FIG. 5 further includes two polarizers 3, arranged in a crossed orientation relative each other, between which a cholesteric liquid crystal layer 2 is sandwiched, and a light direction selection layer 7, which is segmented such that it comprises portions, wherein the portions are configured such that at least one portion is arranged such that it is capable of selecting light incident on the spectral detector 1 having a different direction compared to other portions of the light direction selection layer 7. The light direction selection layer may, for example, consist of one or more absorbing collimators, prisms, etc. In general, each portion is capable of selecting light incident on the spectral detector 1 having a different direction compared to the other portions of the light direction selection layer 7. The pixels of the photo detector array (not shown) can be aligned with the segments or portions of the light direction selection layer 7, so that pixels can be associated with light directions with different angles of incidence. In other words, the spectral detector allows spectral information as a function of angle of incidence to be obtained. In this way a directional scan of the light spectrum can be made. Preferably, the photo detector array 8 consists of one or more of a photodiode array, a charge-coupled device (CCD), and a phototransistor array. However, the photo detector array is not limited to these choices, but rather, any photo detector array that can be used to achieve the function of the first aspect of the invention or embodiments thereof is considered to be within the scope of the invention. Furthermore, wiring, circuits, etc., for coupling the photo detector array to a processing unit, a control unit, analysis equipment, etc. (not shown), have been omitted from FIG. 5 for the purpose of facilitating the explanation of the invention.

The cholesteric optical filter configurations arranged on a photo detector array as described herein have been presented in a layered geometry. However, other configurations are possible, including, but not limited to, curved optical filters or optical filters having at least two faces.

Figure 6A:
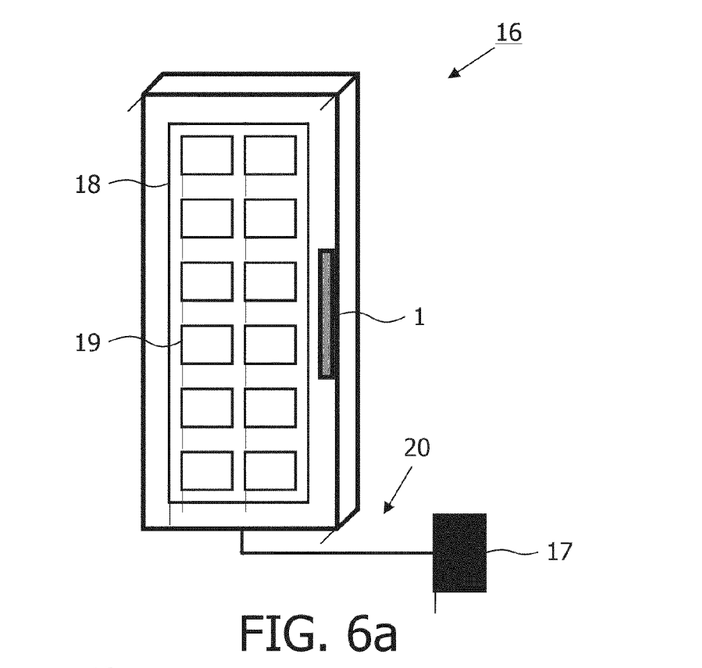
FIGS. 6a-6b are schematic views of exemplary embodiments of the present invention.
Figure 6B:
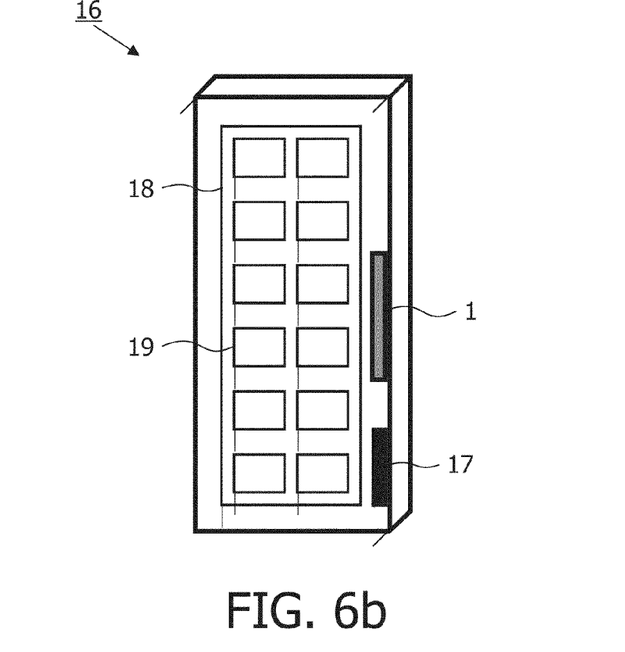

FIGS. 6a and 6b are schematic views illustrating exemplary embodiments of the present invention. The lighting system 16 includes a light module 18, according to the particular embodiments configured as a panel, including a number of light sources 19, such as light-emitting diodes, and a spectral detector 1 according to the first aspect of the invention or embodiments thereof The lighting system 16 further comprises a control unit 17, which can be arranged inside the lighting system 16, preferably integrated with the lighting system 16, or arranged as an external device connected to the lighting system 16 via a connector 20, such as a connecting wire. It is also contemplated that the connector 20 could comprise a wireless communication link for wireless communication between the control unit 17 and the lighting system 16.

The lighting system 16 operates in accordance with one or more parameters, or properties, of the light module 18. Preferably, the one or more parameters is one or more of the color point and the color rendering index of the light emitted by the light sources 19. For controlling the light module 18, the control unit 17 is adapted to perform at least one measurement using the spectral detector 1, and, on the basis of the thus performed measurement, control at least one parameter of the light module 18.

Thus, the lighting system 16 allows for controlling the parameters that govern the operation or illumination properties of the lighting system in a simple and reliable way, by employing measurements performed by the spectral detector 1.

The spectral detector 1 can be positioned within the light module 18, or elsewhere within the lighting system 16, such as illustrated in FIGS. 6a-b, but it can also be positioned outside the lighting system 16 as an external device (not shown) connected to the lighting system 16 via a connector, such as a connecting wire. The connection to the lighting system may also be a remote connection, such as by IR communication, etc. It is also possible to employ multiple light modules within the light source environment.

Even though the present invention has been described with reference to specific exemplifying embodiments thereof, many different alterations, modifications and the like will become apparent for those skilled in the art. The described embodiments are therefore not intended to limit the scope of the present invention, as defined by the appended claims.

Furthermore, in the claims, the indefinite article "a" or "an" does not exclude plurality. Also, any reference signs in the claims should not be construed as limiting the scope of the present invention.

In conclusion, the present invention relates to a spectral detector for measuring properties of light over portions of the electromagnetic spectrum including cholesteric liquid crystal material and switching means capable of varying the pitch of the helix of the cholesteric liquid crystal material, so that the position of the transmission wavelength band is adjusted in response to the switching means. The spectral detector may further include at least one light direction selecting structure for selecting light incident on the spectral detector having a certain angle of incidence. This invention also relates to a lighting system including the spectral detector of the invention.

The invention claimed is:

1. A spectral detector including:
   at least one layer including a cholesteric liquid crystal mixture;
   at least one switching means operatively coupled to at least one of the layers, for varying the helical pitch of the chiral component in the cholesteric liquid crystal mixture included in the layer; and
   a photo detector array coupled to at least one of the layers, wherein the at least one cholesteric liquid crystal layer coupled to the at least one switching means is arranged such that the cholesteric liquid crystal mixture in at least one portion of said cholesteric crystal layer has a different helical pitch than the helical pitch of cholesteric liquid crystal mixture in other portions said of cholesteric liquid crystal layer.

2. The spectral detector according to claim 1, wherein the cholesteric liquid crystal mixture in the at least one cholesteric liquid crystal layer, operatively coupled to the at least one switching means, is one or more of the following:
   thermochromic;
   photochromic; and
   transparent to at least a portion of the spectrum of visible light when an electric field is a lied across said at least one layer.

3. The spectral detector according to claim 1, wherein the cholesteric liquid crystal mixture in the at least one cholesteric liquid crystal layer, operatively coupled to the at least one switching means, is configured such that at least one of the position of the reflection band of said and the magnitude of the reflection band of said layer is changeable.

4. The spectral detector according to claim 1, wherein e a east one switching means is configured to one or more of the following:
   heat a cholesteric liquid crystal layer; and
   apply an electrical field across a cholesteric liquid crystal layer.

5. The spectral detector according to claim 1, further including a light direction selection layer, wherein the light direction selection layer comprises a plurality of portions configured such that at least one portion is arranged such that it is capable of selecting light incident on the spectral detector having a different direction compared to other portions of the light direction selection layer.

6. The spectral detector according to claim 1, further including at least two polarizers, wherein the polarizers are arranged such that at least one layer including a cholesteric liquid crystal mixture is arranged between at least two of the polarizers, and such that at least one of the polarizers has a crossed orientation with respect to at least one of the other polarizers.

7. The spectral detector according to claim 1, further including at least one circular polarizer.

8. The spectral detector according to claim 1, further including at least one absorbing layer.

9. The spectral detector according to claim 1, further including at least one anti-reflection layer.

10. The spectral detector according to claim 1, further including at least one phase retardation layer.

11. The spectral detector according to claim 1, including a plurality of layers, each layer including a cholesteric liquid crystal mixture, the layers being arranged proximate to each other so as to form a composite layer, wherein each of the layers is associated with a reflection wavelength characteristics and a polarization characteristics, and wherein the composite layer is arranged such that light transmitted through the composite layer is independent of the polarization of light incident on the composite layer.

12. The spectral detector according to claim 1, wherein said at least one switching means is capable of varying one or more of the magnitude and the direction of the helical pitch of the chiral component in the cholesteric liquid crystal mixture included in said layer.

13. A lighting system including:
   a control unit;
   at least one light module, including at least one light source, wherein the at least one light module operates in accordance with a plurality of parameters; and
   a spectral detector, including
      at least one layer including, a cholesteric liquid crystal mixture;
      at least one switching means operatively coupled to at least one of the layers, for varying the helical pitch of the chiral component in the cholesteric crystal mixture included in the layer; and
      a photo detector array coupled to at least one of the layers;
   wherein the control unit is configured to perform at least one measurement using the spectral detector and control at least one parameter of the at least one light module based on said at least one measurement.

14. The lighting system according to claim 13, wherein the parameters is one or more of the following:
   the color point of the light emitted by the light sources; and
   the color rendering index of the light emitted by the light sources.

15. The lighting system of claim 13, wherein the at least one cholesteric liquid crystal layer of the spectral detector coupled to the at least one switching means is arranged such that the cholesteric liquid crystal mixture in at least one portion of said cholesteric liquid crystal layer has a different helical pitch than the helical pitch of cholesteric liquid crystal mixture in other portions of said cholesteric liquid crystal layer.

16. The lighting system of claim 13, wherein the spectral detector further includes at least one phase retardation layer.

17. The lighting system of claim 13, wherein the spectral detector further includes a light direction selection layer, wherein the light direction selection layer comprises a plurality of portions configured such that at least one portion is arranged such that it is capable of selecting light incident on the spectral detector having a different direction compared to other portions of the light direction selection layer.

18. A spectral detector including:
   at least one layer including a cholesteric liquid crystal mixture;
   at least one switching means operatively coupled to at least one of the layers, for varying the helical pitch of the chiral component in the cholesteric liquid crystal mixture included in the layer;
   a photo detector array coupled to at least one of the layers; and
   at least one phase retardation layer.

19. A spectral detector including:
   at least one layer including a cholesteric liquid crystal mixture;
   at least one switching means operatively coupled to at least one of the layers, for varying the helical pitch of the chiral component in the cholesteric liquid crystal mixture included in the layer;
   a photo detector array coupled to at least one of the layers; and
   a light direction selection layer, wherein the light direction selection layer comprises a plurality of portions configured such that at least one portion is arranged such that it is capable of selecting light incident on the spectral detector having a different direction compared to other portions of the light direction selection layer.

* * * * *